United States Patent [19]

Maier et al.

[11] 4,173,946

[45] Nov. 13, 1979

[54] MILKING CUP

[75] Inventors: Jakob Maier, Türkheim, Fed. Rep. of Germany; Tilman Hoefelmayr, Zürich, Switzerland

[73] Assignee: Künzler & Co., Berneck, Switzerland

[21] Appl. No.: 945,499

[22] Filed: Sep. 25, 1978

Related U.S. Application Data

[63] Continuation of Ser. No. 689,123, May 24, 1976, abandoned.

[30] Foreign Application Priority Data

May 27, 1975 [DE] Fed. Rep. of Germany ....... 2523465

[51] Int. Cl.$^2$ ................................................. A01J 5/04
[52] U.S. Cl. ............................. 119/14.36; 119/14.38
[58] Field of Search ........................ 119/14.31–14.36, 119/14.38, 14.28, 14.47–14.53

[56] References Cited

U.S. PATENT DOCUMENTS

| 737,669 | 9/1903 | Sharples | 119/14.38 |
| 3,482,547 | 12/1969 | Maier | 119/14.36 |

*Primary Examiner*—Jay N. Eskovitz
*Attorney, Agent, or Firm*—Blanchard, Flynn, Thiel, Boutell & Tanis

[57] ABSTRACT

A milking cup having a sleeve-like cup and a rubber teat holder inserted therein. The rubber teat holder has a suction sleeve portion which is connected at the lower end to a milk discharge pipe connected to a vacuum source. An underpressure relief valve is provided on the milking cup. A tube is connected to and extends between the underpressure relief valve and either the suction sleeve or a member which is connected to and is positioned between the lower end of the suction sleeve and the milk discharge pipe. The end of the tube projects into a passageway defined by the suction sleeve or the member and terminates approximately at the midpoint of the passageway.

6 Claims, 4 Drawing Figures

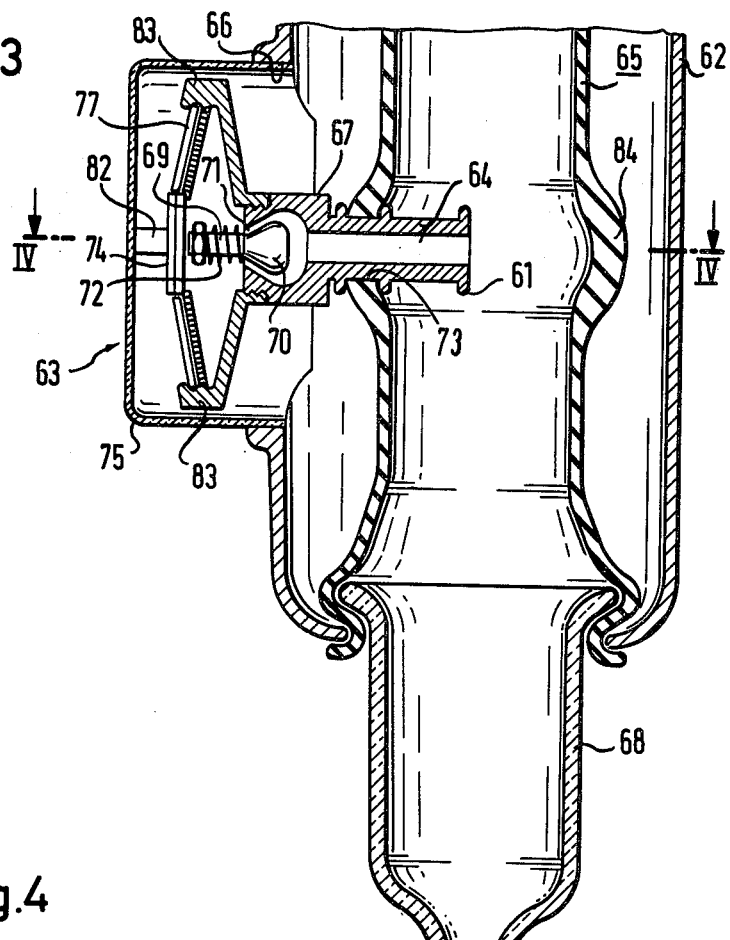
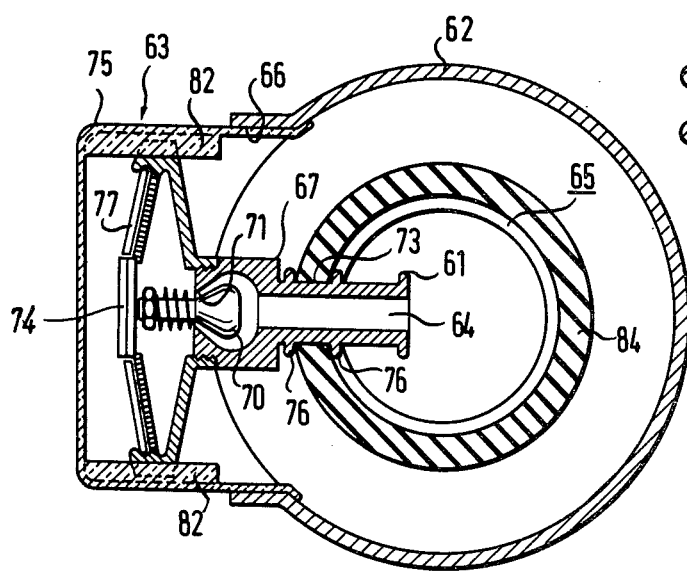

MILKING CUP

This is a continuation, of application Ser. No. 689,123, filed May 24, 1976 and now abandoned.

FIELD OF THE INVENTION

The invention relates to a milking cup having a sleeve-like cup, a rubber teat holder inserted into the cup and having a suction sleeve which can be connected to a milk discharge pipe, and having an underpressure relief valve which is provided on the milking cup and is connected through a tube to the inside of the suction sleeve.

BACKGROUND OF THE INVENTION

German OS No. 23 12 756.2 already discloses a milking cup having a rubber teat holder, in which from an underpressure relief valve which is provided on the milking cup air can flow into the space of the rubber teat holder below the teat. In this milking cup the pipe or tube, which extends from the underpressure relief valve to the suction sleeve, is constructed in one piece with the rubber teat holder and the pipe ends inclined with respect to the axis of the suction sleeve into said suction sleeve. Through this it is achieved that during cleaning of the milking cup, if same is turned upside down, milk flows into this pipe, which leads to the underpressure relief valve, and solidifies there as cheese. Since one can usually not look into the milking cup, these residues are not noticed and can cause the quality of the milk which is later obtained with this milking cup to be affected as well as the entire function of the underpressure relief valve being affected or even completely turned off. The loss of the operation of the underpressure relief valve cannot easily be determined.

U.S. Pat. No. 3,255,732 already discloses a milking cup having a rubber teat holder, in which an additional connecting tube, which terminates approximately at a right angle in the suction sleeve, is formed out directly in one piece with the rubber teat holder. Also in this milking cup occur the already above-mentioned disadvantages of an unnoticed contamination of the supply pipe to the underpressure relief valve. In this known arrangement the pipe which ends in the suction sleeve of the teat rubber must additionally also be guided out through the sleeve-like cup of the milking cup to the outside, which brings about an extremely complicated installation of the rubber teat holder and thus an extremely difficult replaceability of the rubber teat holder. This also makes more difficult the weekly general cleaning operation of the milking cup, as is generally common, and during which the milking cup is disassembled. Furthermore, however, this connecting pipe or tube is subjected to special stresses in as far as, on the one hand, the tube is held fixedly in the cup, while on the other hand the rubber teat holder is being moved back and forth constantly during the milking operation.

Therefore, the basic purpose of the invention is to produce a simple milking cup having a rubber teat holder, in which the relieving air can be introduced into the space below and teat and which permits a simple maintenance of the cleanness of the parts.

This purpose is attained inventively by utilizing a milking cup of the above-mentioned type and locating the end of the tube a ways into the suction sleeve or a member secured to the suction sleeve.

Through this construction, an important advantage is achieved in that a maintenance of cleanness is made substantially easier. In particular, the difficulties which have occurred up to now with respect to the milk residues in the tube leading to the underpressure relief valve are overcome completely.

As particularly advantageous was found an embodiment in which the end of the tube, which projects into the suction sleeve or joint member secured to the suction sleeve, is constructed in form of a drip projection. In particular with respect to any easy cleaning possibility it has also proven to be advantageous to releasably connect the tube to the suction sleeve or to the joint member which is connected to the suction sleeve. In particular, in such a development, additional expenses can be avoided, which can result from forming a one-piece rubber teat holder and tube construction.

It is easily possible to permit the tube to terminate also directly below the teat in the suction sleeve. Especially in such a position of the mouth of the tube, the invention is of a special value, because in this case the condition of the tube, which leads to the underpressure relief valve, can be controlled without particular difficulties. On the other hand, however, especially in this position of the mouth of the tube, two further advantages are gained. One, the teat can be relieved substantially from the underpressure, whereby at the same time sufficient massaging can be carried out, and two, the milk transport problem is solved at the same time in an entirely surprising manner. Because through the air, which during the relief cycle right after the milk flow from the teat stops, flows into the lower and underpressure in the suction sleeve, a discharge of the milk through the discharge vacuum pipe is simultaneously effected without problem. Due to the fact that the relief air is introduced practically directly below the teat, a back injection of milk into the teat does not occur, which up to now has often been a reason for undesired utter infections.

As a whole, a quick milk transport at a reduced cross section of the milk discharge pipe is achieved.

If one permits according to a different embodiment of the invention the tube to extend on the outside of the sleeve-like cup and to terminate in the part of the suction sleeve projecting from the cup or the joint member outside of the cup, then here the important advantage is obtained that the tube can be kept clean particularly well and, if it preferably consists of a transparent material, its cleanliness can also be supervised.

For a maintenance of the cleanliness, it has also been proven to be particularly advantageous to arrange the underpressure relief valve at a point of the cup which is as close as possible to the end of the suction sleeve, which end exits from the cup, or the joint member, so that the length of the tube can be as short as possible.

In order to be able to easily observe the mouth end of the tube for the collection of any residues, which end projects into the end of the suction sleeve projecting from the cup or a joint member, the part of the suction sleeve which projects from the cup or the joint member is preferably manufactured of a transparent material. A further advantage is thereby simultaneously obtained that the perfect functioning of the underpressure relief valve can be controlled or supervised easily during the operation. Because in this case the air, which shoots through the underpressure relief valve and the tube into the inside of the suction sleeve or the joint member, will blow the impact surface free of milk, which can be observed easily.

To reduce the danger of milk running into the mouth of the tube, it has been proven furthermore to be advantageous to enlarge the cross section of the suction sleeve or of the joint member at least at the level of the mouth of the tube compared with the cross section of the milk discharge pipe.

According to a different solution of the invention, a milking cup of the above-mentioned type is provided which is characterized by the underpressure relief valve being constructed as a valve connected through a short tube to the suction sleeve and movably supported in the cup. The valve movement corresponds with the movement of the suction sleeve and can be controlled by the pressure difference which exists between the inside of the suction sleeve on one side and the space between cup and suction sleeve on the other side, which in open condition connects these two spaces with one another. The connecting tube between suction sleeve and underpressure relief valve can in this case be kept especially short. Moreover, the tube can be connected releasably to the suction sleeve and can terminate perpendicularly into same. However, additionally it is possible to provide a drip projection which projects into the suction sleeve and which practically makes it impossible for milk to flow back into the pipeline. Since the valve and also the tube lie, in this case, completely within the cup, the valve and also the tube are both protected from damages.

As a protection for the pressure relief valve and at the same time as a cover for the cup, a transparent cap can be provided which closes off the opening in which the pressure relief valve is mounted. Both the operation of the valve and also, for example, the degree of dirt accumulating in an air filter in front of the underpressure relief valve can be precisely observed through the cap.

A characteristic of the present invention consists mainly in underpressure relief air being able to be supplied directly below the tip of the teat.

One preferable embodiment is the provision of an underpressure relief valve which consists of a valve that can be controlled by the difference pressure existing between the inner space between the cup and the suction sleeve on one side, and the tube on the other side, and which, in open condition, connects the tube to the atmosphere. Such a valve can be adjusted such that it opens and closes precisely at different pressures. Such a valve permits in particular a sudden opening and closing.

If one, however, rather uses an underpressure relief valve which consists of a valve which can be controlled by the pressure difference between the inner space between the cup and the suction sleeve on one side, and the tube on the other side, and connects, in open condition, the tube to the pulsator supply pipe, the advantage is obtained that the pulsator air is used directly as relief air and this air can be cleaned specially.

BRIEF DESCRIPTION OF THE DRAWINGS

The invention will be discussed more in detail in connection with advantageous exemplary embodiments which are illustrated in the drawings, in which:

FIG. 3 is a longitudinal cross-sectional view of a further embodiment of a milking cup which is constructed according to the invention; and FIG. 4 is a cross-sectional view taken along the line IV—IV of the embodiment of a milking cup shown in FIG. 3.

DETAILED DESCRIPTION

Figure 1:
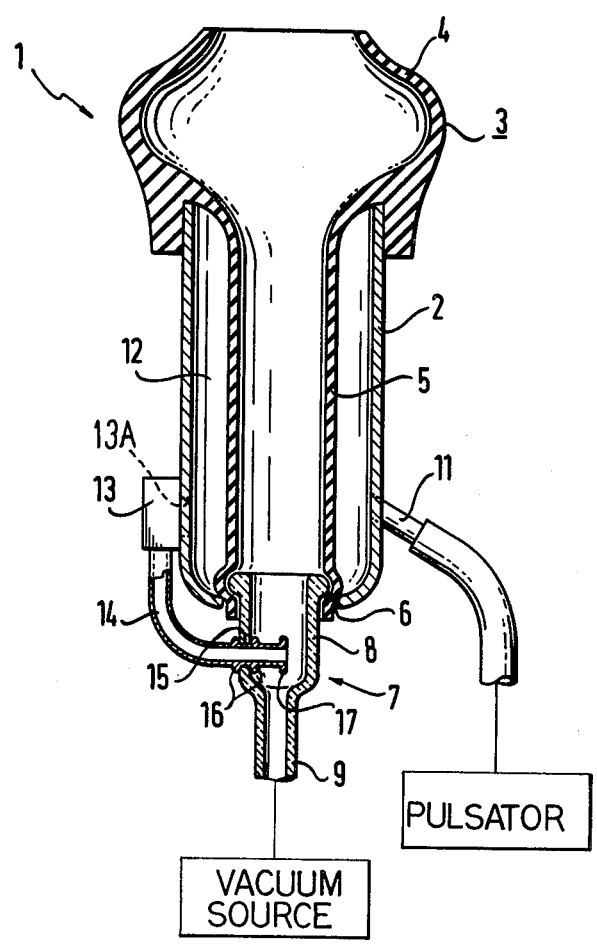
FIG. 1 is a longitudinal cross-sectional view of an embodiment of a milking cup which is constructed according to the invention.

The milking cup is identified in general with the reference numeral 1 in FIG. 1. The milking cup 1 has a sleeve-like cup member 2, into which is inserted a rubber teat holder 3. The rubber teat holder 3 has an enlarged head portion 4 with which it is held onto the upper end of the cup 2 and a suction sleeve portion 5 integral with the head portion 4 and is received in the cup 2 and projects out through an opening 6 in the bottom of the cup 2. The suction sleeve portion 5 is sealed against the wall of the opening 6 and the inner wall of the cup 2 by an inspection member 7. The inspection member 7 consists of a first pipe part 8 having a relatively large inner diameter which transfers into a second pipe part 9 having a smaller diameter. The second pipe part 9 of the inspection member 7 is connected to the milk discharge vacuum pipe and on which a vacuum is continuously applied.

A hollow stub 11 is provided on the cup 2 and provides communication between an annular chamber 12 between the inner wall of the cup 2 and the outer surface of the stub 5 and a pulsator (not illustrated). The chamber 12 is periodically successively subjected to an underpressure and atmospheric pressure. An underpressure relief valve 13 is secured to the outside of the cup 2 and is connected to the chamber 12 through an opening 13A. The underpressure relief valve 13 is connected through a tube 14 to the enlarged pipe part 8 of the inspection member 7. The underpressure relief valve 13 is only schematically illustrated since it performs the actually known task of connecting the pressure in the chamber 12, caused by the pulsator pressure, to the atmosphere through the tube 14. The pressure relief valve 13 is preferably adjusted so that it opens up during the relief cycle at a relatively small increase of the pulsator pressure and closes again at the start of the suction cycle, when the pulsator pressure decreases again from atmospheric pressure toward a predetermined underpressure. Since the suction sleeve portion 5 and the pipe part 8 are constantly under pressure through the milk discharge vacuum pipe, it is thus possible for air under atmospheric pressure to enter the pipe part 8 through the tube 14 upon an opening of the underpressure relief valve 13. As a result, air is permitted to enter into the suction sleeve 5 and also into the milk discharge vacuum line.

The tube 14 is preferably releasably connected to the enlarged pipe part 8 of the inspection member. An opening 15 is provided in the lateral wall of the pipe part 8 of the inspection member 7 and receives one end of the tube 14 therein. To hold the tube 14 in the opening 15, a plurality of axial spaced annular ribs 16 are provided in the periphery of the tube adjacent one end thereof. In the use condition of the tube 14, a pair of annular ribs 16 are positioned on opposite sides of the wall of the pipe part 8 and securely hold the tube 14 in the pipe part 8 as well as sealing the tube 14 to the pipe part 8. The tube 14 itself preferably consists of a flexible and transparent material so that one can visually examine the tube to determine whether or not any residues are therein. The tube 14 preferably projects a certain distance beyond the inner wall of the pipe part 8 into the pipe part 8. A drip projection 17 is preferably constructed on the end of the tube 14 which projects into the pipe part 8. The end of the tube 14 which projects into the pipe part 8 and, in particular the construction of a drip projection 17 at said end, prevents milk from flowing, during the reversal of the milking cup, back from the pipe part 9 and the therewith connected milk discharge vacuum pipe and into the tube 14.

The inspection member is preferably manufactured of a transparent material, so that the discharge of the milk and shooting in of air under atmospheric pressure through the underpressure relief valve 13 can be watched exactly. Of course, it is also possible to suitably extend the suction sleeve 5 in place of the inspection member 7, and the pipe 14 can end directly into said suction sleeve. In this case at least the part of the suction sleeve 5, which part projects from the cup 2, is manufactured of a transparent material.

The underpressure relief valve 13 is mounted preferably at a point on the cup 2, which is as close as possible to the opening 6 of the cup 2. In this manner, it is possible to keep the pipe 14 as short as possible, which is advantageous both for handling of the milking cup and also for observing and keeping the tube 14 clean.

OPERATION

The milking cup 1 operates as follows:

At the start of a milking procedure, a teat which is to be milked is introduced through the opening in the head piece 4 of the rubber teat holder into the suction sleeve 5. An underpressure is then produced through the milk discharge vacuum pipe and the inspection member 7 in the suction sleeve 5. The pulsator starts to operate at the same time. If an underpressure is produced in the chamber 12 by the pulsator, when the milking cup is in a suction cycle, during which the tube 14 is closed off from the atmosphere by the underpressure relief valve 13. The milk flows during the suction cycle through the inspection member 7 into the milk discharge vacuum pipe and discharged through same due to the vacuum applied thereto.

The chamber 12 is then placed under atmospheric pressure during the relief cycle. The underpressure relief valve 13 is thereby opened so that air under atmospheric pressure can flow through the tube 14 into the enlarged pipe part 8 of the inspection member 7. The air which is under atmospheric pressure reduces, on the one hand, the underpressure in the suction sleeve portion 5 so that the teat is relieved and, on the other hand, it contributes to the milk column in the milk discharge vacuum pipe being discharged quickly and without difficulties. The operation of the underpressure relief valve 13 can well be viewed through the transparent inspection member 7 since the inflowing air blows milk away from the inner wall of the enlarged pipe part 8 which is opposite the drip projection 17.

The important advantages of the embodiment shown in FIG. 1 consists in that the rubber teat holder 3 can be designed simply, so that no difficulties are incurred during the formation thereof. Also an easy exchangeability of the rubber teat holder exists. The construction of the tube 14 prevents a returning of the milk in the tipped over condition of the milking cup during cleaning. Finally, the operation of the underpressure relief valve 13 can be precisely monitored.

ALTERNATE CONSTRUCTIONS

Figure 2:
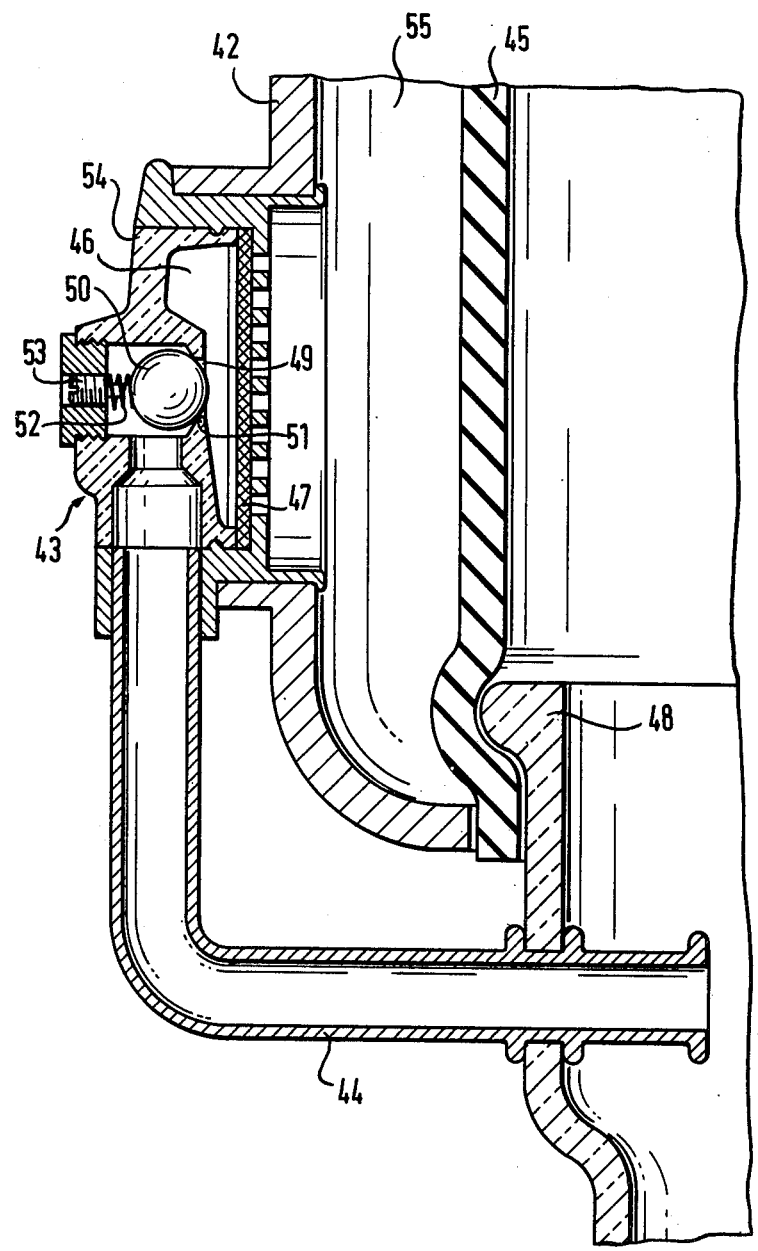
FIG. 2 is a partial longitudinal cross-sectional view of a different embodiment of a milking cup which is constructed according to the invention.

The embodiment illustrated in FIG. 2 corresponds substantially with the embodiment shown in FIG. 1 having a sleeve-like cup 42, a suction sleeve portion 45, an inspection member 48, a tube 44 and a pressure relief valve 43. The pressure relief valve 43 differs from the pressure relief valve 13 shown in FIG. 1 in that it creates in the open condition a connection between the inner space or chamber 55 between the cup 42 and the suction sleeve 45 and the tube 44. A chamber 46 of the valve 43 is connected through a filter 47 to the inner space or chamber 55 between the cup sleeve and the suction sleeve. The chamber 46 is connected through a passageway 49 to the tube 44. However, the passageway 49 is usually closed off by a ball 50 which is resiliently urged to the closed position against a valve slot 51 by a spring 52 engaging and extending between an adjustable abutment 53 and the ball 50. The pressure which is applied to the spring 52 acting onto the ball can be adjusted by a controllable airscrew forming the abutment 53.

The embodiment illustrated in FIG. 2 has aside from the advantages, as they have been shown already in connection with the embodiment illustrated in FIG. 1, the further important advantage that the pulsator air is used as the pressure relief air which can be specially cleaned before such use. Furthermore, a pressure relief takes place in strict dependence on the pulsator pressure which exists in the chamber 55 between cup 42 and suction sleeve portion 45, so that a predetermined pressure difference is assured between the pressure inside of the suction sleeve and the pulsator pressure in the chamber 55 and thus a predetermined massaging action of the teat. The pressure difference, which is at least maintained between the inside of the suction sleeve and chamber 55 can be adjusted exactly by adjusting the initial return force of the spring 52.

The valve 43 has also an important advantage that the filter 47 exists in the protected space between the cup 42 and the suction sleeve portion, and contacts neither milk nor cleaning fluid.

Furthermore, the holder 54 for the valve 43 may be made of a transparent material, so that the respective condition of the filter 47 can be clearly viewed from outside of the milking cup. The entire valve is mounted in the wall of the cup and can be inserted engagingly into same as a connected part.

FIGS. 3 and 4 illustrate a different preferred embodiment of a pressure relief valve with the simultaneous pressure limitation function similar to the valve 43. Just like in the earlier embodiments, a sleeve-like cup 62 supports a suction sleeve 65 and an inspection member 68. The valve 63 is inserted through an opening 66 in the wall of the cup 62. The valve 63 has a valve member 67 housing and supporting a valve tappet 69 having a valve head 70 secured thereon. The valve head 70 is pretensioned to the closed position by a spring 72 against a valve seat 71. The valve member 67 supports a transparent disk 74 which is arranged perpendicularly with respect to the axis of the valve tappet 69 and around which disk is provided a filter 77 for filtering the air which flows through the valve. The valve member 67 is transformed on the side facing the valve head into a tube 64 having annular ribs 76 thereon which straddle the wall surrounding an opening 73 in the suction sleeve to hold the valve member 67 thereon. The tube 64 terminates in a drip projection 61 which projects into the suction sleeve. The opening 66 in the cup 62 is, when the valve 63 is inserted, closed off by a transparent cap 75, through which both a check of the function of the valve and also of the condition of the filter 77 can take place. The cap 75 has guide ribs 82 thereon which guide the valve member 67 axially movably therein and held entirely freely in such a manner that pulsator air flows from the chamber between the cup 62 and the suction sleeve portion 65 between the outer periphery 83 of the valve member 67 and the inside dimension of the cap 75 to one side of the filter 77 and can flow, when the valve head 70 is in the open condition, through the tube 64 into the inside of the suction sleeve portion 65. The force required to open the valve 67 can be adjusted to different initial values by adjusting the return force of the spring 72 so that it opens up at a predetermined pressure difference between the pressure inside the suction sleeve and the pulsator pressure or closes again upon falling below this pressure difference. The valve member 67 itself is moved, corresponding with the movement of the suction sleeve 65, against the cap 75. In order that the free end of the tube 64 is not entirely closed off during the relief cycle by the wall of the suction sleeve, it is preferable, as can be seen from FIG. 3, to form a bulge or enlarged and thick annular bead 84 out the wall of the suction sleeve 65.

A special advantage of this valve 63 is that it is enclosed and protected completely by the cup 62. Since the valve is pretensioned to a certain pressure difference, the valve is closed during a pressure compensation between the inside space of the suction sleeve and pulsator air space, so that during a cleaning of the milking cup a liquid can penetrate into the pulsator chamber. Furthermore, it is possible in this embodiment, since the suction sleeve 65 and the tube 64 are formed separately from one another, for the tube 64 to terminate at a right angle in the suction sleeve and to be provided additionally with a drip projection which projects into the suction sleeve, so that during a cleaning of the milking cup, milk cannot flow into the tube 64. A special important advantage of this embodiment is that the relief air can be introduced into the suction sleeve inside directly below the tip of the teat, so that it is directly effective and leads to a direct relief of the tip of the teat.

The valve 63 is inserted in a simple manner through the opening 66 in the cup 62 and is guided, with the drip projection 61 at the start thereof, through the opening 73 in the suction sleeve 65. It is now only necessary to insert the transparent cap 75 to close the opening 66 into the cup 62.

Although particular preferred embodiments of the invention have been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a milking cup for use with a vacuum source and a pulsator, comprising a rigid cup sleeve, a resiliently flexible rubber teat holder received in said cup sleeve, said rubber teat holder having a teat receiving end and a suction sleeve means connected in fluid circuit with said teat receiving end and milk discharge pipe means connected in fluid circuit with said suction sleeve means, means defining a chamber between said cup sleeve and said rubber teat holder, an under-pressure relief valve mounted on said milking cup and having a fluid connection to said chamber and a characteristic of responding to an under-pressure reduction in said chamber during a relief cycle in a milking operation to facilitate the flow of air into said suction sleeve means, a conduit connected in fluid circuit with and extending between the interior of said milk discharge pipe means and said relief valve, the improvement comprising wherein said conduit extends on the outside of said cup sleeve between said relief valve means and said milk discharge pipe means and has a terminal end which is spaced inwardly of the inner sidewall of said milk discharge pipe means, said terminal end having a radially enlarged flange thereon defining a drip nose having surface means causing milk from a milking operation to collect on said enlarged flange and be prevented from entering said conduit during operative and inoperative time intervals.

2. In a milking cup for use with a vacuum source and a pulsator, comprising a rigid cup sleeve, a resiliently flexible rubber teat holder received in said cup sleeve, said rubber teat holder having a teat receiving end and a suction sleeve means connected in fluid circuit with said teat receiving end and milk discharge pipe means connected in fluid circuit with said suction sleeve means, means defining a chamber between said cup sleeve and said rubber teat holder, an under-pressure relief valve mounted on said milking cup and having a fluid connection to said chamber and a characteristic of responding to an under-pressure reduction in said chamber during a relief cycle in a milking operation to facilitate the flow of air into said suction sleeve means, a conduit connected in fluid circuit with and extending between the interior of said milk discharge pipe means and said relief valve, the improvement comprising wherein said milk discharge pipe means has an opening therein, wherein said conduit extends on the outside of said cup sleeve between said relief valve means and said milk discharge pipe means, through said opening and has a terminal end which is spaced inwardly of the inner sidewall of said milk discharge pipe means, said conduit having releasable connecting means thereon for facilitating a releasable connection of said conduit to said milk discharge pipe means in said opening, said terminal end being positioned adjacent the geometric center of said milk discharge pipe means, the cross section of said milk discharge pipe means being enlarged at least at the level of said opening therein receiving said conduit and with respect to the cross section of the outlet end thereof and wherein said terminal end of said conduit has a radially enlarged flange means thereon defining a drip nose having surface means causing milk from a milking operation to collect on said enlarged flange and be prevented from entering said conduit during operative and inoperative time intervals.

3. The improved milking cup according to claim 2, wherein said cup sleeve has an opening in an end wall thereof and wherein said suction sleeve means projects through said opening in said end wall of said cup sleeve and terminates in an open end, said milk discharge pipe means being received in said open end of said suction sleeve means and effecting a sealed connection between said suction sleeve means and said cup sleeve.

4. The improved milking cup according to claim 2, wherein said conduit consists of a transparent material.

5. The improved milking cup according to claim 2, wherein said milk discharge pipe means consists of a transparent material.

6. The improved milking cup according to claim 2, wherein said under-pressure relief valve is arranged at a location on the outside of and immediately adjacent the bottom of said cup sleeve and said terminal end of said conduit whereby the length of said conduit is short and readily accessible for sanitation maintaining purposes.

* * * * *